United States Patent [19]

McRae et al.

[11] 4,146,840
[45] Mar. 27, 1979

[54] TECHNIQUE FOR OBTAINING SYMBOL TIMING FOR EQUALIZER WEIGHTS

[75] Inventors: Daniel D. McRae, West Melbourne; Frank A. Perkins, Melbourne Village, both of Fla.

[73] Assignee: Harris Corporation, Cleveland, Ohio

[21] Appl. No.: 873,832

[22] Filed: Jan. 31, 1978

[51] Int. Cl.² .......................... H03H 7/36; H04L 7/02
[52] U.S. Cl. .................................... 325/42; 178/69.1; 333/18
[58] Field of Search ................... 325/42, 44, 323, 324; 333/18; 328/155, 63, 72; 364/572, 724; 178/69.1; 179/15 BS

[56] References Cited

U.S. PATENT DOCUMENTS

| | | | |
|---|---|---|---|
| 3,694,752 | 9/1972 | Gibson | 325/42 X |
| 3,881,101 | 4/1975 | Pederson et al. | 364/728 |
| 3,909,752 | 9/1975 | Stuart | 333/18 |
| 4,028,626 | 7/1977 | Motley et al. | 333/18 X |
| 4,071,827 | 1/1978 | Koike et al. | 333/18 X |

*Primary Examiner*—Benedict V. Safourek
*Attorney, Agent, or Firm*—Craig & Antonelli

[57] ABSTRACT

An equalizer-dependent timing recovery system monitors the equalizer weighting coefficient pattern over the entire time span of the equalizer, and differential changes at opposite ends of the pattern are used as a basis for adjusting the receiver symbol timing clock. The magnitudes of a plurality of equalizer weighting coefficients at the beginning of the equalizer are summed and the total is compared with the summed magnitudes of a plurality of equalizer weighting coefficients at the end of the equalizer. Depending upon the sign of the difference between the two totals, the phase (or frequency) of the receiver symbol clock will be adjusted so as to shift the equalizer weighting coefficient pattern in a direction such that the magnitude of the weights at both ends of the equalizers are approximately the same.

Circuitry for implementing the above scheme includes a pair of adders coupled to sets or plural weighting coefficient stages for opposite ends of the equalizer. The outputs of these adders are applied to a subtractor or difference circuit and the sign of the result is controllably gated to an add/delete pulse circuit, which controllably increases or decreases the frequency of symbol timing recovery circuitry by injecting or removing pulses from a stable clock stream prior to frequency division, thereby controllably advancing or retarding the receiver symbol timing clock.

9 Claims, 4 Drawing Figures

TECHNIQUE FOR OBTAINING SYMBOL TIMING FOR EQUALIZER WEIGHTS

FIELD OF THE INVENTION

The present invention relates to data transmission systems and is particularly directed to the recovery of symbol timing by examining the weighting coefficients of the receiver equalizer.

BACKGROUND OF THE INVENTION

Data recovery techniques in present-day communication equipment, such as high frequency modems, commonly make use of adaptive equalizers which are automatically and continually adjusted in an effort to reduce or substantially eliminate intersymbol interference caused by frequency dependent characteristics of the channel. In the case of a modem employing a two-sample per pulse equalizer in which the weighting coefficients are continually updated, modem performance is essentially independent of the relative timing between the transmitted symbol clock and the received symbol clock provided that the drift between the two clocks is sufficiently slow to permit the equalizer to track and the equalizer weight pattern is contained within the time span of the equalizer. Therefore, with sufficient clock stability, and a drift of no more than a few symbols during the time span of modem usage corresponding to that of a normal telephone conversation (less than twelve hours), this symbol rate drift between the transmitted and received clocks may be tolerable.

However, with the expanding development of modem usages, maintaining adequate relative transmitter and receiver symbol timing for considerably lenghty periods of time (as long as several months) requires some scheme of adjusting the received symbol clock to track the transmitter clock. Standard timing loops have been found to be undersirable in that they are either too slow to acquire, they contain too much timing jitter, or both. In place of using conventional timing loops, techniques have been developed whereby the gain coefficients of selected individual taps or stages of a transversal equalizer have been used to provide for carrier and timing control. For example, the U.S. Patents to Gibson, Re 28,638 (3,694,752), Yamamoto et al, 3,872,381 and Stuart 3,909,752 decribe timing recovery schemes wherein the gain coefficients at two respective points on opposite sides of the center point or main tap of a transversal equalizer are compared and used to control the recovered clock signal and/or carrier. In these systems, wherein the transmission rate is fairly low, the center tap of the equalizer may be used as the point of reference, since the largest weighting coefficients are predictably located at the center portion of the equalizer, and over the span of a conversation, any variation in the gain coefficient weighting pattern may only be on the order of one delay tap or stage, so that monitoring the gain coefficients of individual tap locations symmetrically disposed about the middle stage of the equalizer may provide satisfactory timing and carrier phase correction.

However, where the data transmission rate is considerably greater than the relatively low rates employed in the systems described in the above-referred to patents (4800 bauds per second in the patents to Gibson for example), the heaviest or largest weighting coefficients will not necessarily be located at the center of the equalizer and may be shifted substantially toward one end of the equalizer. Therefore, the systems described in the above patents are limited to low transmission rates and are non-workable for communication systems whose transmission rates are considerably higher. It goes without saying that using the weighting coefficients at individual taps immediately adjacent to either side of the center of the equalizer whose values are subject to substantial variation and may be shifted considerably from the location of the maximum weighting coefficients would make accurate symbol timing effectively unattainable.

SUMMARY OF THE INVENTION

In accordance with the present invention, the inadequacies of the equalizer dependent timing recovery systems described in the above patents are remedied by a scheme which monitors the overall equalizer weight pattern over the entire time span of the equalizer. Rather than measure differential variations at singular taps symmetrically located immediately adjacent the center tap of the equalizer, where there is no guarantee that the maximum weighting coefficient will be located, but rather a substantial likelihood that the maximum weighting coefficients will be shifted considerably toward one end of the equalizer, the timing recover technique according to the present invention monitors differential changes at opposite ends of the pattern as a basis for adjusting the receiver symbol timing clock. To this end, the magnitudes of a plurality of equalizer weighting coefficients at the beginning of the equalizer are summed and the total is compared with the summed magnitudes of a plurality of equalizer weighting coefficients at the end of the equalizer. Depending upon the sign of the difference between the two totals, the phase (or frequency) of the receiver symbol clock will be adjusted so as to shift the equalizer weighting coefficient pattern in a direction such that the magnitude of the weights at both ends of the equalizers are approximately the same, which is the optimum delay time for the equalizer.

Circuitry for implementing the above scheme includes a pair of adders coupled to sets or plural weighting coefficient stages for opposite ends of the equalizer. The outputs of these adders are applied to a subtractor or difference circuit and the sign of the result is controllably gated to an add/delete pulse circuit, which controllably increases or decreases the frequency of symbol timing recovery circuitry by injecting or removing pulses from a stable clock stream prior to frequency division, thereby controllably advancing or retarding the receiver symbol timing clock.

DETAILED DESCRIPTION

Figure 1:
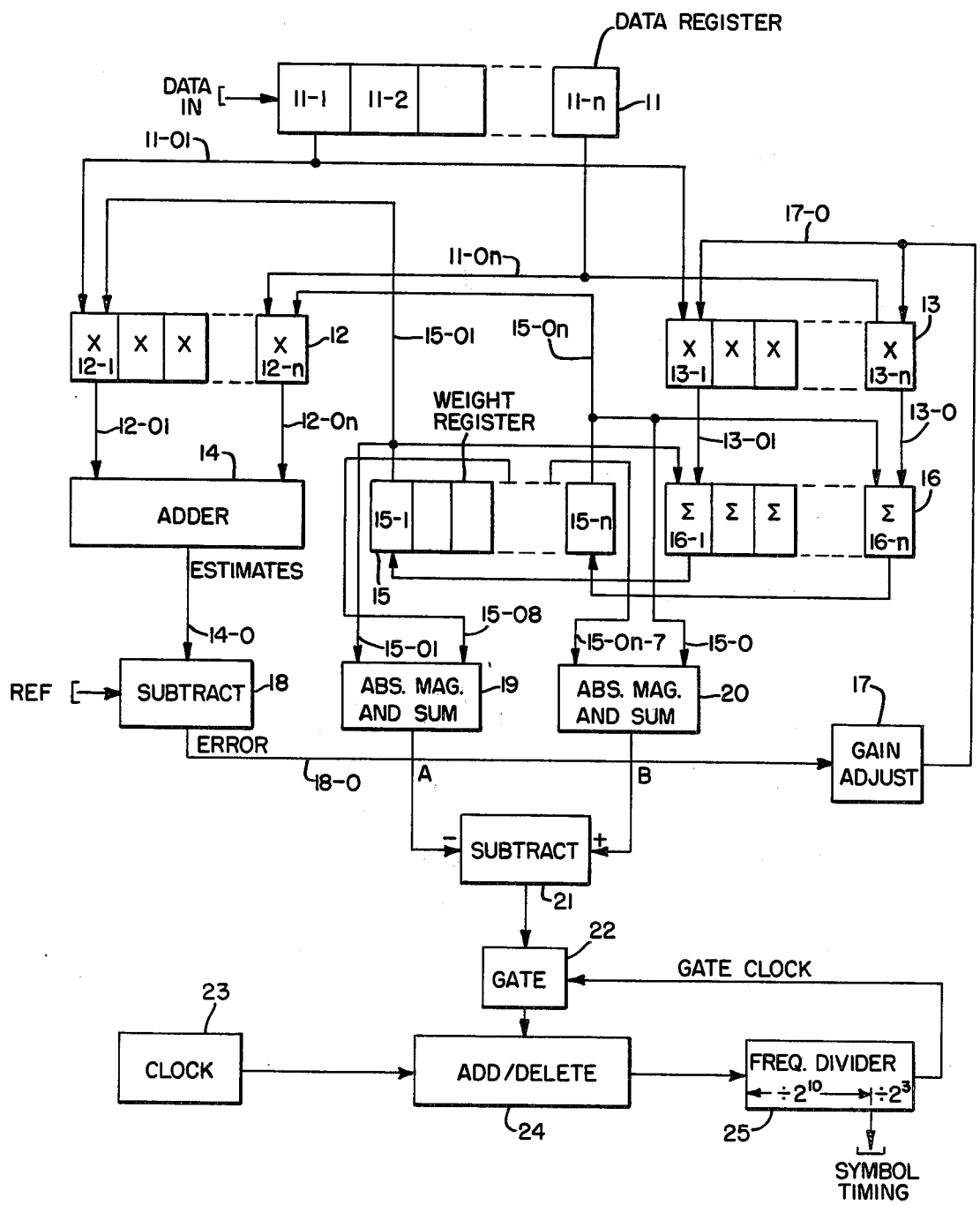
FIG. 1 illustrates a schematic block diagram of a timing recovery scheme in accordance with the present invention.

Referring now to FIG. 1 of the drawings, there are shown a digital embodiment of a transversal equalizer and the symbol timing clock recovery circuit associated therewith. Incoming data is supplied, one symbol at a time, to a data register 11 which is comprised of a plurality of n stages 11-1 to 11-n. Each stage contains the appropriate number of digital storage elements necessary to store incoming and shifted digitized data samples. For purposes of an illustrative example, register 11 may contain 256 stages for storing 256 successive data samples. The outputs of stages 11-1 to 11-n are coupled over lines 11-O1 to 11-On to respective stages 12-1 to 12-n and 13-1 to 13-n of multipliers 12 and 13. Although only single lines are shown between the elements of FIG. 1, it will be understood that the single lines may represent plural conductor leads as necessary to couple all the bits of the data words between components. In addition, for purposes of clarity, connections for only the first and last stage of the respective elements have been depicted.

Second inputs for each of the multiplier stages of multiplier 12 are coupled over lines 15-O1 to 15-On to the respective storage stages 15-1 to 15-n of weighting coefficient storage register 15. The contents of these stages 15-1 to 15-n are also coupled to respective inputs of the adder stages 16-1 to 16-n of adder 16. In addition, the first or lower eight stages 15-1 to 15-8 of register 15 are coupled over lines 15-O1 to 15-O8 to absolute magnitude and summation circuit 19. Similarly, the last or upper eight stages 15-n-7 to 15-n of register 15 are coupled over lines 15-On-7 to 15-On to absolute magnitude and summation circuit 20.

The inputs of the respective stages 15-1 to 15-n of register 15 are coupled over lines 16-O1 to 16-On to the adder stages 16-1 to 16-n of adder 16. Second inputs of stages 16-1 to 16-n of adder 16 are coupled over lines 13-O1 to 13-On to the outputs of multiplier stages 13-1 to 13-n of multiplier 13 are coupled over line 17-O to the output of gain adjust circuit 17. Gain adjust circuit 17 scales the error signal applied over line 18-O from subtract circuit 18 by a prescribed factor and applies the scaled error to each multiplier stage of multiplier 13 to be multiplier by the data samples stored in data register 15. Subtract circuit 18 has a first input coupled over line 14-O to the output of adder 14 and a reference signal, REF, as a second input. The reference signal may be a preselected value or obtained from the most recent data sample in a conventional manner. Adder 14 is coupled over lines 12-O1 to 12-On to each multiplier stages 12-1 to 12-n of multiplier 12 and supplies a summation signal representative of the total of the products of the respective data sample values and the stored weighting coefficients. As will be appreciated from the circuit illustration in the upper portion of FIG. 1, and the foregoing description, components 11–18 form a digital transversal equalizer with data estimates obtained from the output of adder 14. The present invention is not directed to the equalizer, per se, digital components 11–18 described above being a straightforward implementation of a transversal equalizer and performing essentially the same equalization operation as an analog transversal equalizer such as described in the above patents, for example. However, in accordance with the present invention, the equalizer criteria which are used to recover symbol timing differ substantially from those employed in the systems described in the above patents, even though, again, individual components such as pulse control, gating, and frequency division circuitry is used in the present invention, just as it is in systems such as described in the patents to Gibson, for example.

More particularly, the source of symbol timing clock signals constitutes a clock 23, and add/delete circuit 24, coupled to the output of clock 23, a frequency divider 25 coupled to the output of add/delete circuit 24, a gate circuit 22 coupled to the output of frequency divider 25 and to the output of a subtract circuit 21, the output of gate circuit 22 being coupled to control the operation of add/delete circuit 24. Frequency divider 25 may be comprised of a first selected number of stages to divide the high frequency clock signal from clock 23 by a relatively large number such as $2^{10} = 1024$ from which a symbol time clock is derived. Additional divider stages may divide the symbol timing clock by a further value, such as $2^3 = 8$, so that gate 22 will be enabled only every eight data symbols, rather than for each data symbol time. Rather than being coupled to receive weighting coefficient values from individual stages located immediately adjacent the weight stage corresponding to the center symbol stage or center tap of the equalizer, as in the prior art systems described above, subtract circuit 21 is coupled to receive the outputs of absolute magnitude and sum circuits 19 and 20. As described above, circuits 19 and 20 are respectively coupled to a plurality of weighting coefficient stages corresponding to opposite ends of the equalizer so that the entire weighting coefficient pattern over the entire time span of the equalizer is monitored.

Figure 2A:
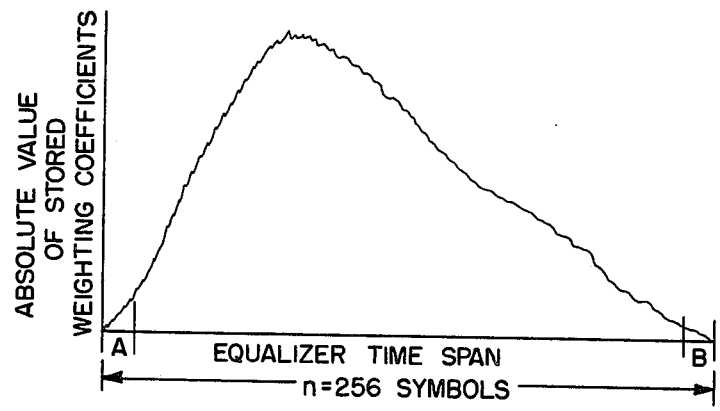
FIGS. 2a through 2c are plots of the absolute values of stored weighting coefficients versus the time span or number of data samples stored in a transversal equalizer.
Figure 2B:
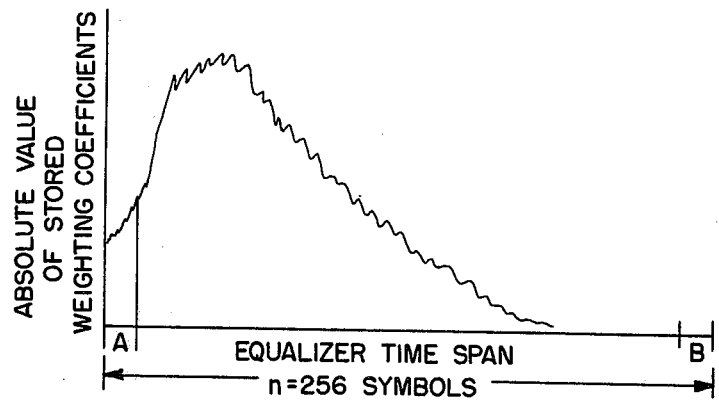
Figure 2C:
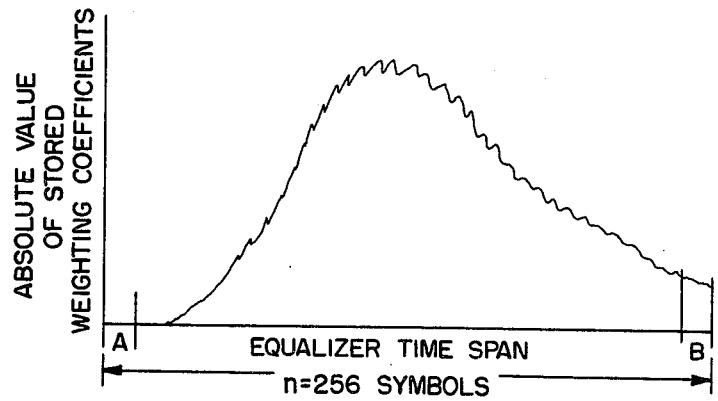

FIGS. 2a through 2c show an exemplary equalizer weighting coefficient absolute value pattern for an equalizer comprised of 256 stages or taps, which number has been found to be of a suitable size for a data transmission scheme having a transmission rate on the order of 16Kbs, which is considerably greater than those described in the above-referred to patents. A selected number of stages, eight has been found to be suitable, at opposite ends of weighting coefficient register 15 are coupled to circuits 19 and 20, wherein the absolute values of the weighting coefficients stored in the eight stages at the beginning and terminal ends of the equalizer, designated by letters A and B, respectively, are summed.

As can be seen from FIG. 2a, where the weighting coefficient pattern is such that it precisely covers the time span of the equalizer, although the heaviest or largest weighting coefficients are shifted relative to the center of the equalizer, the magnitudes of weighting coefficients at opposite ends of the equalizer, namely, for the oldest data samples and most recently received data samples, are approximately equal to zero. FIG. 2b shows the case where the weighting coefficient pattern has effectively shifted towards the end of the equalizer containing the most recent data samples, whereas FIG. 2c illustrates a weighting coefficient pattern which has effectively shifted toward the end of the equalizer which contains the oldest stored data samples. In accordance with the present invention, the receiver clock generation circuitry is adjusted to balance the weighting coefficient pattern at the opposite ends of the equalizer, even in the case where the time span of the equalizer may be too long or too short for the characteristics of the channel. To achieve this balance, the sum of the weighting coefficients in region A (most recent eight symbols) is subtracted from the sum of the weighting coefficients to region B (oldest stored eight symbols) of the weighting coefficient storage register. If the sign of the result of this subtraction operation is positive, the symbol timing is delayed, whereas, if the sign of the result of the subtraction operation is negative, the symbol timing is advanced, so as to effectively shift the weighting coefficient pattern in a direction to balance the coefficients at the end of the equalizer and obtain proper symbol timing.

Considering now the operation of the configuration of the invention shown in FIG. 1, incoming data symbols are shifted into data register 11 and data estimates are obtained based upon a standard transversal equalization operation. More specifically, the contents of the respective stages 11-1 to 11-n of data storage register 11 are multiplied in multiplier stages 12-1 to 12-n of multiplier 12 by the weighting coefficients stored in stages 15-1 to 15-n of register 15. The products are summed in adder 14 to obtain an estimate of the data symbol based on the average of the span of the equalizer, or effectively the center symbol stored in register 11. Each estimate is compared in subtraction circuit 18 with a reference value, such as the data input symbol, and an error signal is supplied on line 18-O to be scaled in gain adjust circuit 17. This gain adjusted error factor is applied to the equalizer correlator composed of multiplier 13 and adder 16. Adder 16 sums the products of the gain factor in line 17-O and the contents of stages 11-1 to 11-n of register 11 times the weighting coefficients stored in register 15. These sums are then applied to weight register 15 to update the weighting coefficients based on the most recent error signal and the present contents of data register 11. The absolute values of the contents of stages 15-1 to 15-8 and stages 15-n-7 to 15-n of weighting coefficient register 15 are respectively summed in circuits 19 and 20 and the resulting totals corresponding to regions A and B of the ends of the equalizer, as shown in FIGS. 2a through 2c, are subtracted in subtraction circuit 21. The sign of the result is applied to gate circuit 22 which controls add/delete circuit 22. Gate circuit 22 is enabled every m symbol time ($m = 8$ in the example illustrated) by frequency divider 25, so as to apply the sign output of subtraction circuit 21 to add/delete circuit 24, so that frequency divider 25 will divide the output of clock 23 (altered in accordance with add/delete circuit 24) by $2^{10}$ to generate a symbol time clock pulse and by $2^{13}$ to generate a gate clock pulse for enabling gate circuit 22. Depending upon the sign of the output of subtraction circuit 21, gate circuit 22 will cause add/delete circuit 24 to add or delete a clock pulse from the high frequency clock signal generated by clock 23 and thereby respectively advance or delay the symbol timing.

Namely, if the sign of the output of subtraction circuit 21 is negative, indicating a shift in the weighting coefficient pattern toward the front of the equalizer as shown in FIG. 2b, add/delete circuit 24 adds a pulse to the high frequency clock signal so frequency divider 25 will reach its count of 2048 earlier than normal, whereby the symbol timing is advanced and the pattern shown in FIG. 2b will be effectively shifted toward the rear of the equalizer. On the other hand, if the sign of the output of subtraction circuit 21 is positive, indicating a shift in the weighting coefficient pattern toward the rear of the equalizer as shown in FIG. 2c, add/delete circuit 24 deletes a pulse from the high frequency clock signal so that frequency divider 25 will reach its count of 2048 later than normal, whereby the symbol timing is delayed and the weighting coefficient pattern shown in FIG. 2c will be effectively shifted toward the front of the equalizer.

As will be appeciated from the foregoing description of the invention, symbol timing for a high data rate modem can be obtained by monitoring weighting coefficients at opposite ends of an adaptive transversal equalizer and controllably advancing or retarding the symbol clock so as to equate the magnitudes of the equalizer weighting coefficients for the oldest and most recently stored data sample values. This technique permits a substantial degree of divergence of the heaviest or largest weighting coefficients over the time span of the equalizer as is necessary for equalizer operation at high transmission rates.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In a data receiver system having an adaptive equalizer to which received symbols are applied for recovering transmitted data symbols, an improved method of obtaining symbol timing based upon equalizer weighting coefficients comprising the steps of:
    generating a receiver symbol clock at a prescribed timing rate;
    comparing the weighting coefficients for the opposite ends of the equalizer; and
    adjusting said timing rate in dependence upon a prescribed relationship between weighting coefficients for the opposite ends of the equalizer in response to said comparing step.

2. An improved method according to claim 1, wherein said comparing step comprises comparing the absolute values of weighting coefficients for opposite ends of the equalizer, and said adjusting step comprises advancing or retarding said timing rate in dependence upon which of said weighting coefficients have the larger absolute values.

3. An improved method according to claim 1, wherein said comparing step comprises
    comparing a first sum of the absolute values of a plurality of weighting coefficients for a series of data symbols at the beginning of said equalizer with a second sum of the absolute values of a plurality of weighting coefficients at the terminating end of the equalizer and generating a signal representative of which of said first and second sums is the larger, and
    said adjusting step comprises one of
    advancing said timing rate in response to said signal representing that said first sum is the larger, and
    retarding said timing rate in response to said signal representing that said second sum is the larger.

4. In a data receiver system having an adaptive equalizer to which received data symbols are applied for recovering transmitted data symbols, an improved system for obtaining symbol timing based upon equalizer weighting coefficients comprising:
    first means for generating a receiver symbol clock at a prescribed timing rate;
    second means, coupled to said equalizer, for comparing weighting coefficients for the opposite ends of the equalizer; and
    third means, coupled to said first and second means, for adjusting said timing rate in dependence upon a prescribed relationship between weighting coefficients for the opposite ends of the equalizer.

5. An improved system according to claim 4, wherein said second means comprises means for comparing the absolute values of weighting coefficients for opposite ends of the equalizer, and said third means comprises means for either advancing or retarding said timing rate in dependence upon which of said weighting coefficients have the larger absolute values.

6. An improved system according to claim 4, wherein said second means comprises means, coupled to receive a first plurality of weighting coefficients for a series of data symbols at the beginning of the equalizer, for generating a first signal representative of the sum of the absolute values of said first plurality of weighting coefficients, means, coupled to receive a second plurality of weighting coefficients for a series of data symbols at the terminating end of the equalizer, for generating a second signal representative of the sum of the absolute values of said second plurality of weighting coeffcients, and means, coupled to said first signal generating means and to said second signal generating means, for generating a third signal representative of which of said first and second signals is the larger.

7. An improved system according to claim 6, wherein said third means comprises means, coupled to said first means and to said third signal generating means, for advancing said timing rate in response to said third signal representing that said first signal is larger than said second signal, and for retarding said timing rate in response to said third signal representing that said second signal is larger than said first signal.

8. An improved system according to claim 6, wherein said first means comprises means for generating a train of high frequency clock pulses, means, coupled to said clock pulse generating means, for counting clock pulses supplied thereto and generating a receiver symbol clock signal upon counting a preselected number of said high frequency clock pulses, and wherein said third means comprises means, coupled between said high frequency clock pulse generating means and said counting means, and responsive to said third signal generating means, for controllably altering the train of clock pulses supplied to said counting means, so that said counting means reaches said preselected number in response to said third signal representing that said first signal is larger than said second signal, at a time advanced relative to the time it reaches said preselected number in response to said third signal representing that said second signal is larger than said first signal.

9. An improved system according to claim 8, wherein said third means includes means for periodically coupling said third signal to said clock pulse train altering means at a rate slower than said prescribed timing rate.

* * * * *